United States Patent [19]

Nagai et al.

[11] 4,309,696
[45] Jan. 5, 1982

[54] TROUBLE DETECTING UNIT IN AN OPTICAL SECURITY DEVICE

[75] Inventors: Shunichi Nagai, Komatsu; Yasuhiro Umano, Terai, both of Japan

[73] Assignee: Kabushiki Kaisha Komatsu Seisakusho, Tokyo, Japan

[21] Appl. No.: 918,835

[22] Filed: Jun. 26, 1978

[51] Int. Cl.³ .......................... G08B 29/00; F16D 9/00
[52] U.S. Cl. .................................... 340/515; 340/516; 340/518; 340/555; 340/679; 250/200; 361/174; 192/129 R; 192/134
[58] Field of Search .............. 340/556, 515, 516, 552, 340/573, 679, 518, 555, 514, 526, 531, 532; 250/218, 221, 222, 209, 208, 199, 200, 201, 562, 563; 361/173, 174, 176, 177; 192/129 R, 134; 455/613

[56] References Cited

U.S. PATENT DOCUMENTS

| | | | |
|---|---|---|---|
| 3,668,674 | 6/1972 | Westendorf | 340/515 |
| 3,886,413 | 5/1975 | Dow et al. | 340/516 |
| 3,970,846 | 7/1976 | Schofield | 340/516 |
| 4,118,688 | 10/1978 | Glennon | 340/516 |

FOREIGN PATENT DOCUMENTS 1218412  1/1971  United Kingdom ............... 192/134

*Primary Examiner*—John W. Caldwell, Sr.
*Assistant Examiner*—Donnie L. Crosland
*Attorney, Agent, or Firm*—Spensley, Horn, Jubas & Lubitz

[57] ABSTRACT

A trouble detecting unit in an optical security device intentionally produces a state which is equivalent to a state in which the security system is out of order so as to check whether an emergency stop signal is produced or not and judges that the security system is in order if the emergency stop signal is produced and that the security system is out of order if the emergency stop signal is not produced. This checking is made while the security system need not be in operation. In a press, for example, the checking is made while the press is being lifted from a bottom dead center. A state which is equivalent to the one in which the security system is out of order is produced by intercepting, one by one, signals to light emitting elements or signals from light receiving elements.

4 Claims, 4 Drawing Figures

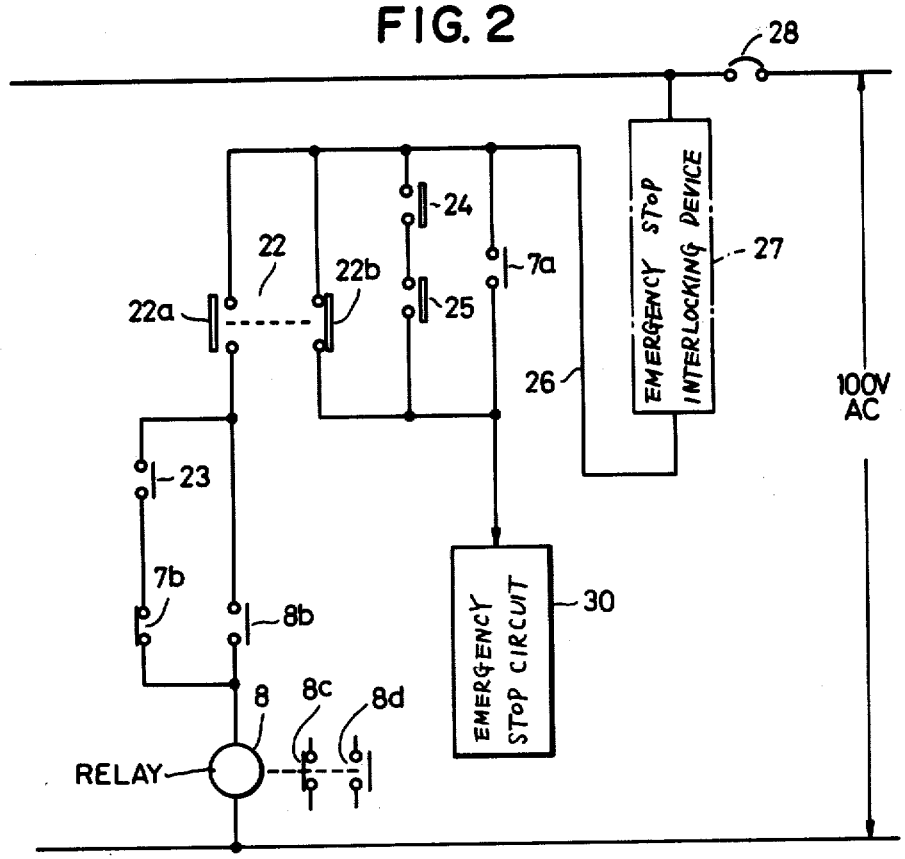
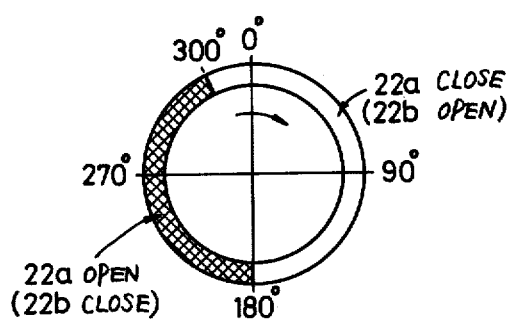

4,309,696

TROUBLE DETECTING UNIT IN AN OPTICAL SECURITY DEVICE

BACKGROUND OF THE INVENTION

This invention relates to a trouble detecting unit in an optical security device which is employed for a press or the like.

An optical security device is employed for a press or the like for safety of an operator. In the optical security device, a single or plural light beams are emitted into a hazardous area where an operator may be injured. When the light beams are intercepted by a part of the person, an emergency stop signal is outputted by the device to stop the slide of the press, for instance.

If the light emitting elements adapted to emit light beams, or the light receiving elements adapted to receive the light beams, or their relating circuits become out of order in the above-described conventional optical security device, sometimes it may not work as security means. Therefore, if in such a case the person extends his hand, etc. into the hazardous area, he may lose the hand. A trouble in the optical security system is undoubtedly hazardous to the person.

However, there has been provided no means for detecting the abnormal conditions of the light emitting element, light receiving elements and their relating circuits in the optical security device.

SUMMARY OF THE INVENTION

In view of the foregoing, an object of this invention is to provide a security mechanism in which it is checked whether or not the light emitting elements, light receiving element and their relating circuits of an optical security device are normally operated, and when they are found in normal operating states, the succeeding operation of an apparatus for which the optical security device is provided is permitted.

The novel features which are believed characteristic of this invention are set forth in the appended claims. The invention itself, however, together with additional objects and advantages thereof will be best understood from the following detailed description taken in conjunction with the accompanying drawings which illustrate, by way of example only, one preferred embodiment of the invention.

BRIEF DESCRIPTION OF THE DRAWINGS

In the accompanying drawings:

FIG. 2 is a block diagram showing one example of a press control circuit concerning the trouble detecting unit shown in FIG. 1;

FIG. 3 is an explanatory diagram showing the relation between press stroke angles and contact means employed in the press control circuit shown in FIG. 2.

DETAILED DESCRIPTION OF THE INVENTION

Figure 1:
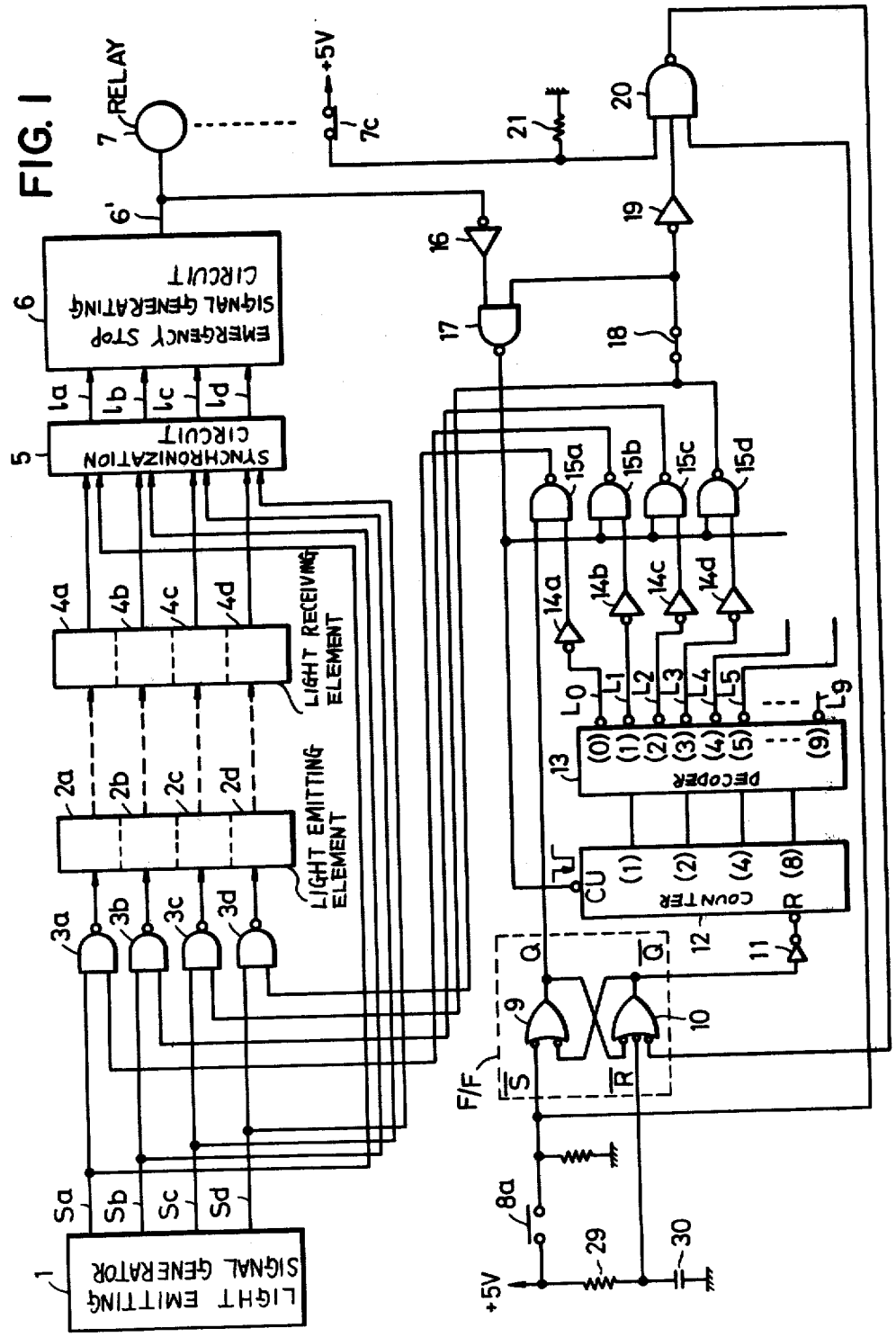
FIG. 1 is a block diagram illustrating one example of a trouble detecting unit of an optical security device, according to this invention.

Shown in FIG. 1 is one example of a trouble detecting unit of an optical security device which is employed for security of a press.

A light emitting signal generator 1 operates to generate light emitting signals Sa, Sb, Sc and Sd which cause light emitting elements 2a, 2b, 2c and 2d to emit light beams, respectively. The light emitting signals Sa, Sb, Sc and Sd are applied through 2-input NAND circuits 3a, 3b, 3c and 3d to the light emitting elements 2a, 2b, 2c and 2d, respectively. The light emitting elements 2a through 2d are made up of light emission diodes for instance, and are adapted to emit light beams to dangerous area where, for instance, the slide of the press is passed. The light emitting elements 2a through 2d are confronted with light receiving elements 4a, 4b, 4c and 4d respectively. Upon reception of the light beams emitted by the light emitting elements 2a through 2d, the light receiving elements 4a through 4d output light reception signals which are applied to a synchronization circuit 5 to which the light emitting signals Sa through Sd are applied. In the synchronization circuit 5, it is checked whether the light emitting signals and the light reception signals are available or not. When the light emitting signals and the light reception signals are available, signals are outputted to respective output lines 1a, 1b, 1c and 1d by the synchronization circuit 5. More specifically, when a light emitting signal and its corresponding light reception signal are available, a signal is outputted to the respective output line. When a light emitting signal is available, but its corresponding light reception signal is not available, it is determined that the light beam is blocked by something, and no output is produced by the synchronization circuit 5 for the respective output line. That is, in the synchronization circuit 5, it is checked whether or not the light emitting signals and the light reception signals are paired respectively. The synchronization circuit 5 may be constituted by a group of AND circuits operating the logical products of the light emitting signals Sa through Sd and the light reception signals, or a group of EXCLUSIVE OR circuits operating the exclusive logical sums of them.

An emergency stop signal generating circuit 6 collects the signals provided on the output lines 1a through 1d, so that it outputs a high level signal when all of the signals are available, and it outputs a low level signal when any one of the signals are not available. The circuit 6 may be constituted by a 4-input AND circuit for instance. The output signal of the emergency stop signal generating circuit 6 is applied to a relay coil 7. When the output signal of the circuit 6 is at the high level, the relay coil 7 is energized; but when it is at the low level, the relay coil 7 is deenergized. In addition, the trouble detecting unit is so designed that when the relay coil 7 is deenergized during the operation of the press, a relay contact means 7a (FIG. 2) is opened to apply an emergency stop signal to the press, as will be described later.

A contact means 8a is closed when a relay coil 8 (FIG. 2) is energized. The relay coil 8 is maintained deenergized when the slide (not shown) of the press is being lifted as in the case of the press stroke ranged from 180° to 300° and it is therefore unnecessary to operate the security device.

NOR circuits 9 and 10 form a flip-flop FF. When a signal applied to an input terminal $\bar{S}$ of the NOR circuit 9 has a low level, the output Q of the NOR circuit 9, namely, the set output of the flip-flop FF is raised to a high level. When a signal applied to an input terminal $\bar{R}$ of the NOR circuit 10 has a low level, the output $\bar{Q}$ of the NOR circuit 9 is switched to a low level. The output Q of the NOR circuit 10 is the inversion output of the set output Q, and this signal is applied through an inverter 11 to the reset terminal R of a counter 12.

The counter 12 is a binary counter. A signal from a NAND circuit 17 described later is applied to the count input terminal CU of the counter 12. The counter 12 counts up when the signal from the NAND circuit 17 falls. The count value of the counter 12 is applied to a decoder 13, where it is converted into a BCD code. Therefore, when the count value of the counter 12 is zero, only an output line $L_0$ indicating "0" of the decoder 13 is at the low level, but the remaining output line $L_1$ through $L_9$ indicating respectively "1" through "9" are at the high level.

A capacitor 30 is to reset the aforementioned flip-flop FF when the device is energized. Upon energization of the device, the voltage of the capacitor 30 is raised to the high level from the low level according to the time constant determined by the resistance of a resistor 29 and the capacitance of the capacitor 30. By utilizing this fact, circuits such as for instance the flip-flop FF are initially cleared.

Consider the case where the relay coil 8 (FIG. 2) is deenergized, the contact means 8a thereof is open, and the count value of the counter 12 is zero. In this case, the input $\overline{S}$ of the NOR circuit 9 forming the flip-flop is switched to the low level, while the output Q of the NOR circuit 9 is raised to the high level. This high level signal is applied to one input of a 2-input NAND circuit 15a, to the other input of which a signal obtained by inverting the signal on the output line $L_0$ of the decoder 13 by an inverter 14a is applied. As the count value of the counter 12 is zero (0), the signal on the output line $L_0$ of the decoder 13 is at the low level. Thus, the NAND condition of the NAND circuit 15a is satisfied, and a low level signal is applied to the NAND circuit 3a by the NAND circuit 15a. As a result, the NAND circuit 3a is closed, so that the light emitting signal Sa from the light emitting signal generating circuit 1 is blocked. Signals obtained by inverting the signals on the output lines $L_1$, $L_2$ and $L_3$ of the decoder 13 by respective inverters 14b, 14d and 14d are applied to first input terminals of 2-input NAND circuits 15b, 15c and 15d, to the second input terminals which the output of a NAND circuit 17 is commonly applied. The outputs of the NAND circuits 15b, 15c and 15d are applied to the NAND circuits 3b, 3c and 3d, respectively. In this case, the outputs on the output lines $L_1$, $L_2$ and $L_3$ of the decoder 13 are at the high level. Therefore, the NAND conditions of the NAND circuits 15b, 15c and 15d are not satisfied, and accordingly the NAND circuits 3b, 3c and 3d are in open state. Therefore, the light of only the light emitting element 2a corresponding to the light emitting signal Sa goes out, as a result of which the output of the light receiving element 4a corresponding to the light emitting element 2a is eliminated, while the signal on the output line 1a of the synchronization circuit 5 is eliminated, and the output of the emergency stop signal generating circuit 6 is changed to the low level.

The output of the emergency stop signal generating circuit 6 is inverted by an inverter 16, and the output thus inverted is applied to one input terminal of the NAND circuit 17. The NAND circuit 17 is a 2-input NAND circuit, to the other input terminal of which the signal on the output line $L_3$ of the decoder 13 is applied through the inverter 14d, the NAND circuit 15d and a jumper wire 18. In this connection, as the signal on the output line $L_3$ of the decoder 13 is at the high level, the output of the inverter 14d is at the low level. Accordingly, the NAND condition of the NAND circuit 15d is not satisfied, and the signal applied to the NAND circuit 17 from the NAND circuit 15d is at the high level. Thus, the NAND condition of the NAND circuit 17 is satisfied, and the signal changed from the high level to the low level is applied to the count input terminal CU of the counter 12, as a result of which the counter 12 counts up. Accordingly, the level of the signal on the outer line $L_0$ of the decoder 13 is changed from the low level to the high level, while the level of the signal on the output line $L_1$ is switched to the low level from the high level. When the signal on the output line $L_0$ is raised to the high level as was described, the NAND condition of the NAND circuit 15a is not satisfied, that is, the output of the NAND circuit 15a is raised to the high level. Therefore, the NAND circuit 3a is opened, and the light emitting element 2a is lit. Thus, all the light emitting elements are lit, and therefore the output of the emergency stop signal generating circuit 6 is raised to the high level, and the NAND condition of the NAND circuit 17 is not satisfied. However, as the signal on the output line $L_1$ is changed to the low level, the NAND condition of the NAND circuit 15b is satisfied. As a result, the low level signal is applied to the NAND circuit 3b by the NAND circuit 15b. Therefore, the light emitting signal Sb is blocked, and the light of the light emitting element 2b corresponding to the light emitting signal Sb is caused to go out. Therefore, the output signal of the light receiving element 4b corresponding to the light emitting element 2b is eliminated, the output of the emergency stop signal generating circuit 6 is changed to the low level, and the counter 12 counts up when the output of the NAND circuit 17 falls.

As is apparent from the above description, the NAND conditions of the NAND circuits 15a through 15d are successively satisfied according to the count values of the counter 12, and the NAND circuits 3a through 3d are scanned in such a manner as to be successively closed by the outputs of the NAND circuits 15a through 15d. That is, the scanning is effected in such a manner that the light emitting signals Sa through Sd applied to the light emitting elements 2a through 2b by the light emitting signal generating circuit 1 are successively blocked, as a result of which, the lights of the light emitting elements 2a through 2d are successively caused to go out. When the count value of the counter 12 reaches the decimal number "3", the output level of the output line $L_3$ of the decoder 13 is changed to the low level, and the NAND condition of the NAND circuit 15d is satisfied. Accordingly, the output of the NAND circuit 15d is lowered to the low level, and this low level output is applied through the jumper wire 18 to one input terminal of the NAND circuit 17. Therefore, the NAND circuit 17 is closed, and the counting operation of the counter 12 is suspended.

The output of the NAND circuit 15d obtained through the jumper wire 18 is applied through an inverter 19 to one input terminal of a 3-input NAND circuit 20, to the remaining input terminals of which a signal from a relay contact means 7c which is opened by energization of the relay coil 7, and a signal from the relay contact means 8a are applied. The signal from the relay contact means 8a is at the low level when the latter 8a is opened, and it is at the high level when closed. The signal from the relay contact means 7c is grounded through a resistor 21, and therefore the signal is at the high level when the relay contact means 7c is closed, and it is at the low level when opened. Accordingly, when the contact means 8a is closed, the NAND condition of the NAND circuit 20 is satisfied, and the low level signal is applied to the input terminal of the NOR circuit 10 of the flip-flop FF. As a result, the inversion output $\overline{Q}$ of the flip-flop FF, namely the output of the NOR circuit 10, is changed to the high level. This high level output is applied through the inverter 11 to the reset terminal R of the counter 12 to reset the latter 12. When the counter 12 is reset, all the output signals of the decoder 13 except the output signal on the output line $L_0$ are raised to the high level, while the output Q of the flip-flop FF, or the output of the NOR circuit 9 is changed to the low level. Therefore, the NAND conditions of the NAND circuits 15a through 15d are not satisfied, and accordingly all of the NAND circuits 3a through 3d are opened. Therefore, the output of the emergency stop signal generating circuit 6 is raised to the high level, and checking all the light beams is completed.

The above description is for the operation effected when the light emitting elements 2a through 2d, the light receiving elements 4a through 4d, and their relating circuits are normally operated. If the light emitting elements 2a through 2d, the light receiving elements 4a through 4d, or their relating circuits becomes out of order, then even if scanning is effected so as to successively block the light emitting signals Sa through Sd applied to the light emitting elements 2a through 2d, the output level of the emergency stop signal generating circuit 6 is not changed to the low level, and the relay coil 7 is maintained energized.

FIG. 2 shows one example of a press control circuit concerning the above-described trouble detecting unit. A relay coil 8 is to operate contact means 8b, 8c and 8d and the contact means 8a (FIG. 1). When the relay coil 8 is deenergized, the contact means 8a, 8b and 8d are opened, but the contact means 8c is closed. When the relay coil 8 is energized, the contact means 8a, 8b and 8d are closed, but the contact means 8c is opened. In FIG. 2, the contact means 8c and 8d are not connected to any circuit. However, the contact means 8c is to ensure the energization and deenergization of the relay coil 8. In addition, when the contact means 8d is closed, the press operation is permitted; when it is opened, the press operation is prohibited. Accordingly, in practice, they are connected to suitable points in the press circuit.

A rotary cam switch 22 operates in response to a stroke angle of the presses and has two contact means 22a and 22b. The operations of the two contact means 22a and 22b are as indicated in FIG. 3. When the stroke angle is from 180° (the bottom dead center) to 300° C. as indicated by hatching lines, the contact means 22a is opened, while the contact means 22b is closed. On the other hand, when the stroke angle is from 300° to 180°, the contact means 22a is closed, while the contact means 22b is opened. When the stroke angle is from 180° to 300°, the slide (not shown) of the press is being lifted, and in this case the operation of the security device is not required.

A contact means 23 is a relay contact means which is closed when the stroke angle exceeds 300° with the aid of a signal outputted by a clutch brake control circuit (not shown) of the press and the start preparation of the press is completed. A relay coil actuating the relay contact means 23 is not shown.

Contact means 24 and 25 are opened when a clutch brake solenoid valve (not shown) is excited, or when the press operation is effected, and they are maintained open during the press operation.

Contact means 7a and 7b are operated by the relay coil 7 shown in FIG. 1. When the relay coil 7 is energized, the contact means 7a is closed, while the contact means 7b is opened. In contrast, when the relay coil 7 is deenergized, the contact means 7a is opened, while the contact means 7b is closed.

The contact means 22b, 24, 25 and 7a serve to determine the operating condition of an emergency stop circuit 30. More specifically, only when all of the contact means 22b, 24, 25 and 7a are opened, the emergency stop circuit 30 is operated to stop the slide of the press. The emergency stop circuit 30 operates to stop the slide of the press when supplying current to the circuit 30 through a line 26 is suspended; however, the detailed description thereof will be omitted because it is not related to the subject matter of the present invention. An emergency stop interlocking device 27 is to stop the press with the aid of elements other than the security device according to the invention in emergency, and it is not related directly to the invention. In FIG. 2, reference numeral 28 is intended to designate a no-fuse breaker in a press control circuit.

When the press stroke angle is from 180° to 300°, the contact means 22a of the rotary cam switch 22 is maintained opened, while the contact means 22b is maintained closed, as shown in FIG. 3. The relay coil 8 is deenergized by the opening of the contact means 22a, while the emergency stop circuit is energized through the line 26 and the contact means 22b by the closing of the contact means 22b to inhibit the operation of the emergency stop circuit. While the press stroke angle is changed from 180° to 300°, the security device is checked. In other words, where the relay coil 8 is deenergized, the contact means 8a (FIG. 1) is open, and the flip-flop FF is set. Thus, as was described before, the NAND circuits 3a through 3d are successively closed, and the scanning is effected in such a manner that the light emitting signals Sa through Sd applied to the light emitting elements 2a through 2d by the light emitting signal generating circuit 1 are successively blocked. In this case, the emergency stop signal generating circuit 6 provides the low level output and the high level output alternately, in response to which the relay coil 7 is deenergized and energized alternately to open and close the contact means 7a. In this case, however, the emergency stop circuit 30 is not operated because it has been inhibited by the energization through the contact means 22b of the rotary cam switch 22. If no abnormality is detected by this scanning, when the press stroke angle exceeds 300° and the contact means 22a of the rotary cam switch 22 and the contact means 23 are closed, current flows in the relay coil 8 through the contact means 22a, 23 and 7b to energize the relay coil 8. As a result, the contact means 8d is closed to place the press in operable state. As the contact means 8a is closed, the NAND condition of the NAND circuit 20 (FIG. 1) is satisfied. Therefore, the flip-flop FF is reset, and the output of the emergency stop signal generating circuit 6 is raised to the high level, whereby the inhibition of the security device is released. That is, when the light beams emitted by the light emitting elements 2a through 2d are intercepted by a part of a person for instance, the output of the emergency stop signal generating circuit 6 is switched to the low level. As a result, the relay coil 7 is deenergized and its contact means 7a is opened, whereby the current supply to the emergency stop circuit 30 is suspended and the emergency stop circuit 30 is therefore operated. The energization of the relay coil 8 is self-held by the relay contact means 8b which is closed by energization of the relay coil 8. This self-holding is released when the press stroke angle exceeds the bottom dead point 180° and the contact means 22a of the rotary cam switch 22 is opened. Therefore, similarly as in the above-described case, the checking of the security device is carried out.

On the other hand, if abnormality is detected through the scanning, the relay coil 7 (FIG. 1) is maintained energized, and therefore the contact means 7a is maintained closed, while the contact means 7b is maintained opened. Therefore, even if the press stroke angle exceeds 300° and the contact means 22a of the rotary cam switch 22 and the contact means 23 are closed, the relay coil 8 is not energized, and the contact means 8d thereof is not closed. Therefore, the press operation is inhibited, and the press is urgently stopped.

As is apparent from the above description, the light emitting elements 2a through 2d, the light receiving elements 4a through 4d, and their relating circuits in the security device is checked every cycle of the press. Only when no abnormality is detected in one cycle, the next cycle of press operation is permitted.

In the above description, the checking period is such that the press stroke angle is from 180° to 300°; however, the present invention is not limited thereby or thereto. That is, it can be set to an optional period during which the operation of the security device is not required. This setting can be readily achieved by changing the operating angles of the contact means 22a and 22b of the rotary cam switch 22.

While the invention has been described with reference to the press, it is obvious that the invention can be applied to any mechine having an optical security device.

As is apparent from the above description, according to the invention, it can be completely checked whether or not the light emitting elements, the light receiving elements and their relating circuits are normally operated, and accordingly it is possible to ensure the operation of the security device.

Figure 4:
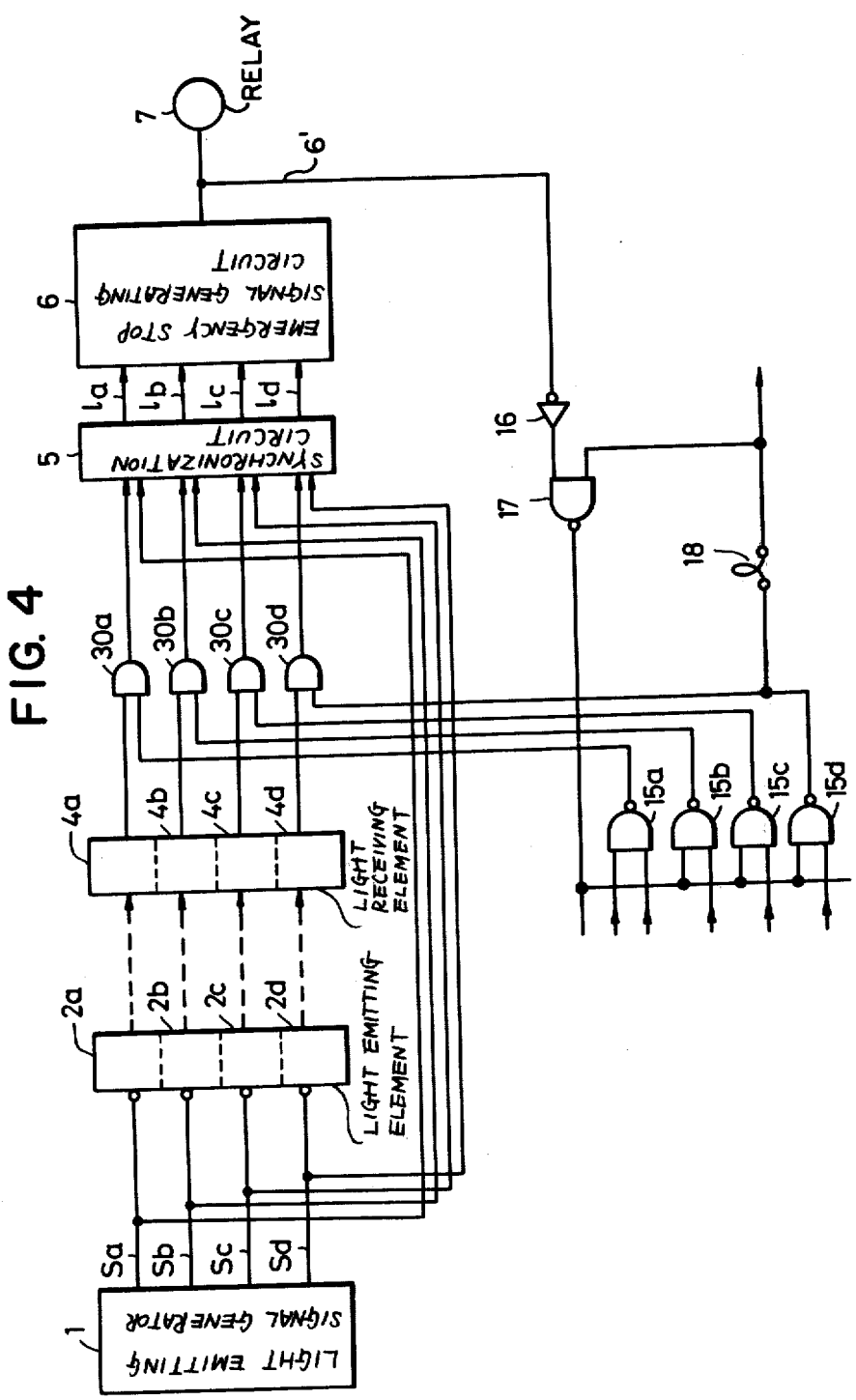
FIG. 4 is a block diagram showing another example of the trouble detecting unit according to the invention.

In the above described example, the input signals to the light emitting elements 2a-2d which emit light beams are successively intercepted by successively disenabling the NAND circuits 3a-3d. FIG. 4 shows an alternative arrangement for detecting abnormal conditions of the optical security device. In FIG. 4, AND circuits 30a-30d which are successively disenabled by outputs of NAND circuits 15a-15d are provided on the output side of the light receiving elements 4a-4d so that output signals of the light receiving elements 4a-4d are successively intercepted.

What is claimed is:

1. In an optical security device wherein at least one light beam is emitted into a hazardous area and an emergency stop signal is applied to cause the abrupt halting of a hazardous machine in response to interception of the light beam, a trouble detecting unit comprising:
   a detection circuit which operates during a testing time period in which the hazardous machine is not energized and operation of said optical security device is not required, to detect a fault in said optical security device,
   wherein said detection circuit comprises a counter and a scanning circuit for scanning and intercepting, one by one, input signals to a plurality of light emitting elements which emit light beams and means for detecting faults in said optical security device on a condition that an emergency stop signal is not generated in response to the interception of each of said input signals wherein said scanning circuit is driven by the output of said counter and the count of said counter at the end of the testing time period indicates a place of disorder when a fault has been detected; and
   switching means for preventing energization of the hazardous machine at the end of said testing time period in response to the detection of a fault in the optical security device during the testing time period.

2. In an optical security device wherein at least one light beam is emitted into a hazardous area and an emergency stop signal is applied to cause the abrupt halting of a hazardous machine in response to interception of the light beam, a trouble detecting unit comprising:
   a detection circuit which operates during a testing time period in which the hazardous machine is not energized and operation of said optical security device is not required, to detect a fault in said optical security device,
   wherein said detection circuit comprises a counter and a scanning circuit for scanning and intercepting, one by one, output signals of a plurality of light receiving elements which receive light beams and means for detecting faults in said optical security device on a condition that an emergency stop signal is not generated in response to the interception of each of said output signals wherein said scanning circuit is driven by the output of said counter and the count of said counter at the end of the testing time period indicates a place of disorder when a fault has been detected,
   switching means for preventing energization of the hazardous machine at the end of said testing time period in response to the detection of a fault in the optical security device during the testing time period.

3. The trouble detecting unit of claim 1 or 2 wherein said counter is incremented when an emergency stop signal is generated during the testing time period, whereby the failure to generate an emergency stop signal will prevent the incrementing of said counter and thereby halt the operation of said scanning circuit.

4. In an optical security device wherein a plurality of light beams are emitted into a hazardous area and an emergency stop signal is applied to an objective apparatus in response to interception of the light beam, a trouble detecting unit comprising:
   a detection circuit which operates during a period in which the operation of said optical security device is not required, to detect an abnormal condition of said optical security device, wherein said detection circuit comprises a scanner which sequentially scans said light beams in order to simulate an interruption of each beam, the scanning operation of said scanner being stopped (a) after the scanner has scanned all of the light beams and no abnormal condition has been detected, or (b) during a scan if an abnormal condition has been detected;
   holding means for holding an output from said detection circuit representative of a result of detection during said period in which the operation of said optical security device is not required;

wherein said holding means includes a first relay and connected to the optical security device, said relay being held in a first condition if the scanner was stopped after no abnormal condition was detected and held in a second condition if the scanner was stopped after detection of an abnormal condition; and means for enabling said optical security device to operate in response to contents of the signal held by said holding means at the time when said period in which the operation of said optical security device is not required has terminated, wherein said means for enabling includes a second relay, which is connected to and the energization of which is controlled by a first contact actuated by said first relay, the energization of said second relay actuating a second contact which resets said scanner and enables operation of the optical security device, wherein said second relay is de-energized during said period in which operation of said optical security device is not required and energized near the end of said period only if no abnormal condition was detected.

* * * * *